United States Patent
Robinson (10) Patent No.: US 7,343,419 B1
(45) Date of Patent: Mar. 11, 2008

(54) REROUTING MEDIA TO SELECTED MEDIA APPLICATIONS

(75) Inventor: John Robinson, South Riding, VA (US)

(73) Assignee: AOL LLC, Dulles, VA (US)

(*) Notice: Subject to any disclaimer, the term of this patent is extended or adjusted under 35 U.S.C. 154(b) by 687 days.

(21) Appl. No.: 09/971,086

(22) Filed: Oct. 5, 2001

Related U.S. Application Data (60) Provisional application No. 60/237,697, filed on Oct. 5, 2000.

(51) Int. Cl.
  G06F 15/16  (2006.01)
  H04N 7/173  (2006.01)
  H04N 7/16   (2006.01)

(52) U.S. Cl. .................. 709/231; 725/86; 725/135; 725/141

(58) Field of Classification Search ........... 709/231, 709/246, 217, 218, 219, 232; 725/345, 86, 725/135, 136, 137, 138, 139, 140, 141, 142
See application file for complete search history.

(56) References Cited

U.S. PATENT DOCUMENTS

| | | | |
|---|---|---|---|
| 6,009,462 A * | 12/1999 | Birrell et al. ............... 709/206 |
| 6,035,330 A * | 3/2000 | Astiz et al. ................. 709/217 |
| 6,088,717 A * | 7/2000 | Reed et al. ................. 709/201 |
| 6,167,567 A | 12/2000 | Chiles et al. | |
| 6,212,574 B1 | 4/2001 | O'Rourke et al. | |
| 6,263,363 B1 * | 7/2001 | Rosenblatt et al. ......... 709/217 |
| 6,292,824 B1 | 9/2001 | Siksa | |
| 6,314,501 B1 | 11/2001 | Gulick | |
| 6,374,402 B1 * | 4/2002 | Schmeidler et al. ........ 717/167 |
| 6,401,099 B1 * | 6/2002 | Koppolu et al. ........ 707/103 R |
| 6,460,058 B2 * | 10/2002 | Koppolu et al. ............ 715/738 |
| 6,564,255 B1 * | 5/2003 | Mobini et al. .............. 709/219 |
| 6,681,325 B1 * | 1/2004 | Marsh et al. .................. 713/2 |
| 6,886,171 B2 | 4/2005 | MacLeod | |
| 7,017,189 B1 * | 3/2006 | DeMello et al. .............. 726/26 |
| 2002/0166038 A1 | 11/2002 | MacLeod | |
| 2003/0037178 A1 | 2/2003 | Vessey | |
| 2003/0202010 A1 | 10/2003 | Kerby et al. | |
| 2005/0210412 A1 | 9/2005 | Matthews et al. | |

* cited by examiner

*Primary Examiner*—Saleh Najjar
*Assistant Examiner*—V. Korobov
(74) *Attorney, Agent, or Firm*—Fish & Richardson P.C.

(57) ABSTRACT

A data stream may be processed using a computer system by receiving the data stream using a browser application, detecting a content type of data in the data stream, temporarily overriding a default rendering process otherwise associated with the content type detected for the data in the data stream by associating a particular rendering process with the data stream based on the type of data in the data stream, and routing the data stream to the particular rendering process. The default rendering process may be identified in a registry of the computer system. It may be temporarily overridden by discriminating among internal and external instances of the browser application used to receive the data stream, and temporarily overriding the default rendering process only if the browser application is an internal instance.

17 Claims, 7 Drawing Sheets

REROUTING MEDIA TO SELECTED MEDIA APPLICATIONS

CROSS-REFERENCE TO RELATED APPLICATIONS

This application claims priority to U.S. Provisional Application No. 60/237,697, filed on Oct. 5, 2000, which is incorporated herein by reference.

TECHNICAL FIELD

The disclosure relates generally to the manipulation of content being accessed by a computer, and more specifically to rerouting multimedia content received by a computer having an operating system that maintains default settings for specific data types of multimedia content.

BACKGROUND

A browser is often used to receive, process, and display electronic media content made available through a computer network or from the memory of a local computer. The browser may include functionality for processing and displaying some types of media content to the user, but may need to call upon and export data to external media players when other types of media content need to be processed and displayed to the user. The browser may access a registry of alternate media players available for processing particular types of media content, and certain alternate media players may be designated as default players for certain media types. If multiple instances of a single browser or several different browsers are loaded, however, the media players specified by the registry are applied to each of the browser loads.

SUMMARY

In one general aspect, a data stream may be processed using a computer system by receiving the data stream using a browser application, detecting a content type of data in the data stream, temporarily overriding a default rendering process otherwise associated with the content type detected for the data in the data stream by associating a particular rendering process with the data stream based on the type of data in the data stream, and routing the data stream to the particular rendering process.

Implementations may include one or more of the following features. For example, the data in the data stream may be a Multipurpose Internet Mail Extension (MIME) data, which may be received in response to a request from the browser application.

The default rendering process may be identified in a registry of the computer system. It may be temporarily overridden by discriminating among internal and external instances of the browser application used to receive the data stream, and temporarily overriding the default rendering process only if the browser application is an internal instance. As such, the data stream may be routed to the default rendering process if the browser application is an external instance. The default rendering process may be identified in a registry of the computer, which is supplemented with the particular rendering process in order to override the default rendering process if the browser application is an internal instance. The data stream may be processed using the temporary rendering process, which thereafter is disassociated with the type of data in the data stream.

Furthermore, the content type may be redefined after routing the data stream to prevent subsequent processing of the data stream by the default rendering.

In another general aspect, a data stream stored on a computer readable medium may be processed by receiving a data stream using a browser application, identifying a stream type for the data stream, and directing the data stream away from a data process designated as a default by the computer system based on the data type identified for the data stream.

Implementations may include one or more of the following features. For example, the process may include determining whether a browser is embedded as an internal instance of a software application, such that the data stream is directed away from the data process designated as the default when determined to be an internal instance. Furthermore, the data type may be a Multipurpose Internet Mail Extensions (MIME) data type.

In yet another general aspect, a data stream may be processed by calling a data stream using a browser running on a computer system, detecting a first type of data associated with the data stream called by the browser, and redefining the first type of data as a second type of data.

Implementations may include one or more of the following features. For example, the first and second types of data may be Multipurpose Internet Mail Extensions (MIME) standard types. When a MIME filter is loaded into an operating system of the computer, the processing may include receiving notification in the browser that a data stream is available for filtering by the MIME filter, and/or activating a multimedia subsystem player running on the computer system to render the data stream. In addition, the processing may include passing the data stream to the player.

These general and specific aspects may be implemented using a system, a method, or a computer program, or any combination of systems, methods, and computer programs. The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
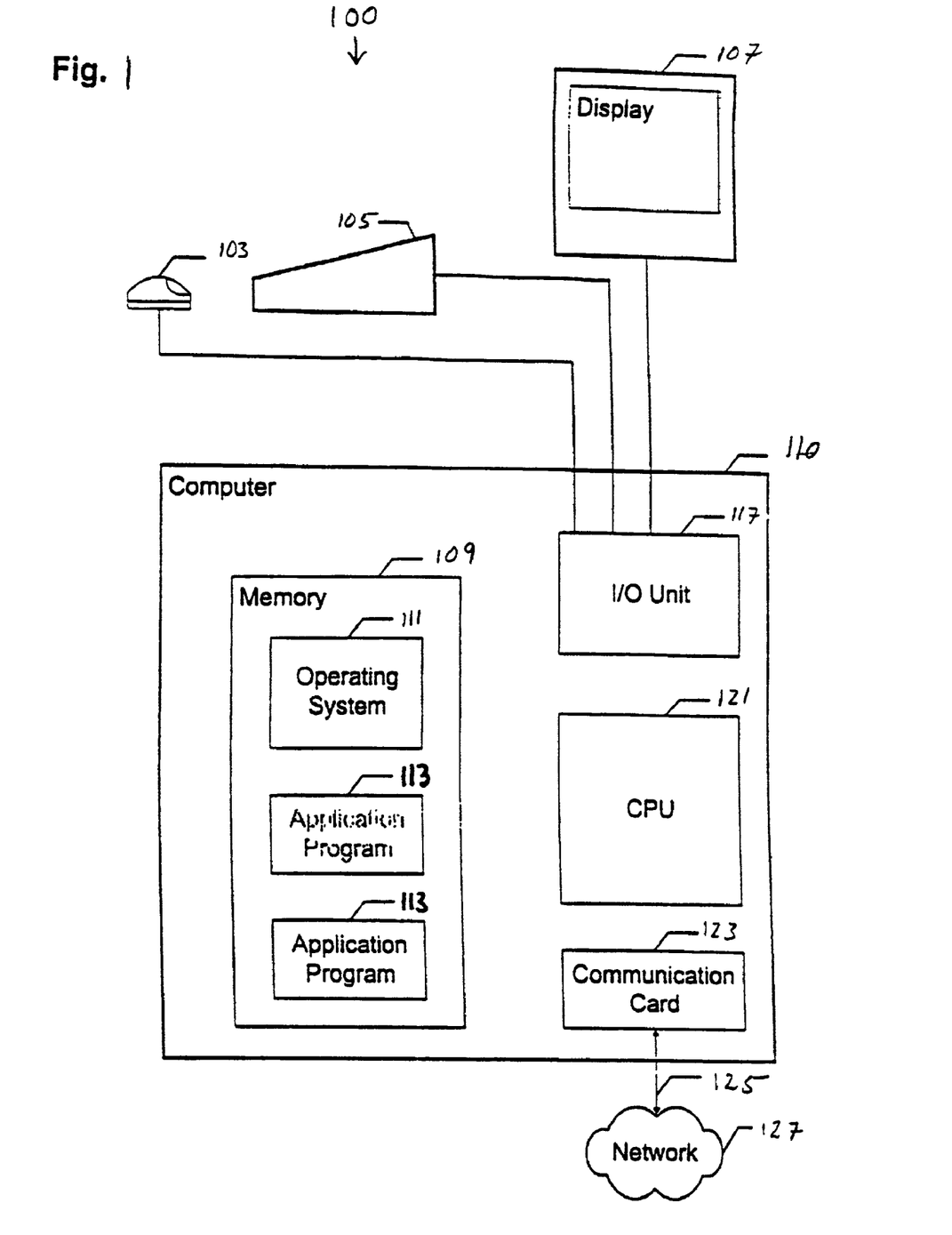
FIG. 1 is a block diagram of a computer system.

Referring to FIG. 1, a computer system 100 represents a hardware setup for executing software that allows a user to perform tasks such as communicating with other computer users, accessing various computer resources, and viewing, creating, or otherwise manipulating electronic media content—that is, any combination of text, images, movies, music or other sounds, animations, 3D virtual worlds, and links to other objects. The computer system 100 of FIG. 1 also may be programmed with computer-readable instructions to enable content to be perceived (for example, viewed) without being captured (for example, copied, saved, or printed).

The system includes various input/output (I/O) devices (for example, mouse 103, keyboard 105, display 107) and a general purpose computer 110 having a central processor unit (CPU) 121, an I/O unit 117 and a memory 109 that stores data and various programs such as an operating system 111, and one or more application programs 113. The computer system 100 also may include some sort of communications card or device 123 (for example, a modem or network adapter) for exchanging data with a network 127 through a communications link 125 (for example, a telephone line).

Figure 2:
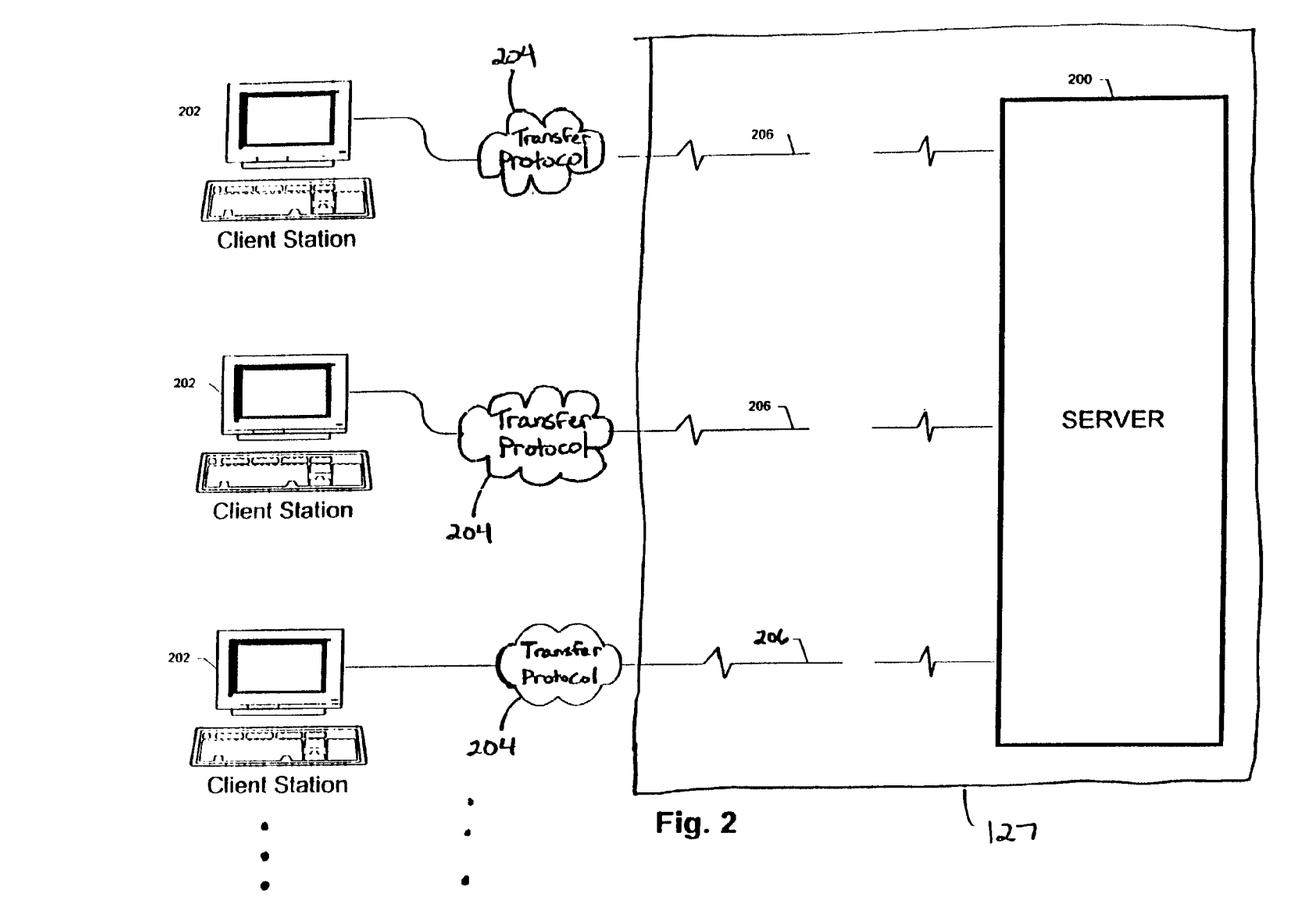
FIG. 2 shows a typical graphical user interface (GUI) environment.

As shown in FIG. 2, using network 127, a computer system can access electronic content or other resources either stored locally at a local client system 202 (for example, a personal or laptop computer), remotely at one or more server systems 200, or at other client systems 202. An example of a server system 200 is a host computer that provides subscribers with online computer data and services such as e-mail, e-commerce, chat rooms, Internet access, electronic newspapers and magazines.

Users of a host computer's online services typically communicate with one or more central server systems 200 through client software executing on their respective client systems 202. In practice, a server system 200 typically is a network of interconnected server computers rather than a single monolithic entity. The servers may be physically dispersed from each other, and each may be dedicated to its own set of duties and/or to a particular geographical region. Where the server computers are physically dispersed, they may be interconnected by a network of communication links.

Each client system 202 runs client software that enables communication with corresponding software running on the server system 200. The client systems 202 communicate with the server system 200 through various channels 204 and lines 206, such as a modem connected to a telephone line, a direct Internet connection using a transfer protocol such as TCP/IP (Transmission Control Protocol/Internet Protocol), a cable modem and cable line(s), an integrated services digital network (ISDN), or some other transfer protocol. The server system 200 is responsible for receiving input from the client systems 202, manipulating the collective body of input information (and possibly information from other sources) into a useful format, and retransmitting the formatted information back to one or more clients 202 for output on an output device, such as a display screen.

A "browser" is an example of client software that enables access and viewing of electronic content stored either locally or remotely, such as in a network environment of interconnected computer systems (for example, local area network (LAN), wide area network (WAN), intranet, Internet). A browser typically is used for displaying documents described in Hyper-Text Markup Language (HTML) and stored on servers connected to a network such as the Internet. A user instructs a browser to access an electronic document (e.g., a web page) by specifying a network address—or Uniform Resource Locator (URL)—indicating the location of a desired web page. In response, the browser contacts the corresponding server 200 hosting the requested web page, retrieves the one or more files that make up the web page, and then displays the web page in a window on the user's computer screen.

Figure 3:
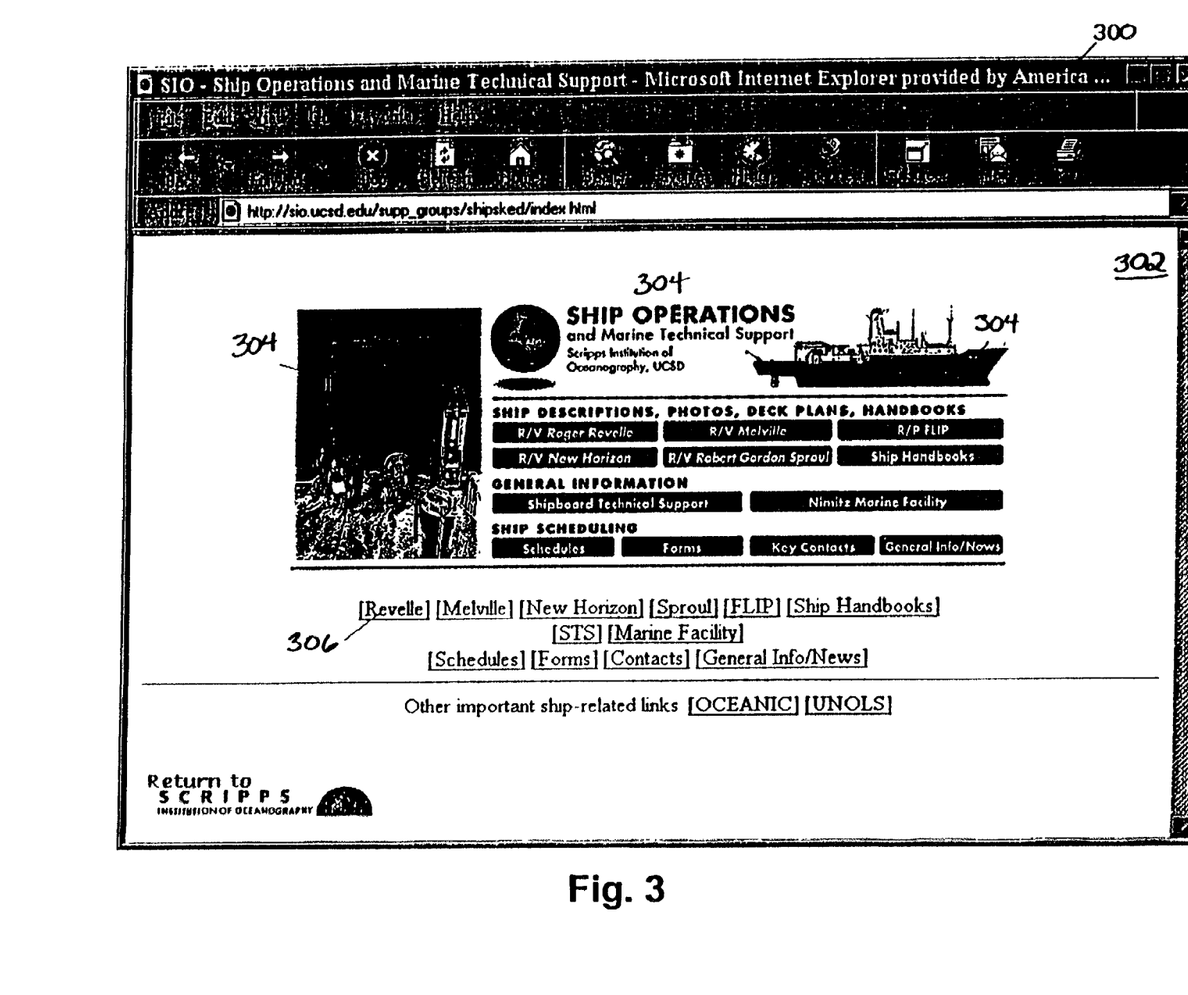
FIG. 3 is a screenshot of a browser window.

FIG. 3 is a screenshot of a browser application 300 displaying a typical web page 302. As shown therein, a single web page 302 may include several different files of similar or different data types 304 (for example, text, graphics, images, virtual worlds, sounds, and movies). The browser 300 may display or play data content using its own internal functionality or, if data content contained in web page 302 is a type that cannot be displayed with the browser's internal functionality, it may export the data content to an alternate media player so that the data content may be processed and displayed by the alternate media player.

Web page 302 can include links 306 pointing to other resources (for example, other web pages or individual files) available at the server system 200 or through the network 127. Links 306 can take virtually any visual form. For example, they can appear as a text string, as a graphical image, or as a combination thereof. Each link 306 has an associated URL pointing to a location on the network 127. When a user selects a displayed link 306, the browser may retrieve the web page (or other resources, such as, for example, movies or sound files) corresponding to the URL associated with the link automatically and may attempt to display and execute the electronic information of the retrieved web page or resource. If the browser cannot display and execute a data type contained in the retrieved web page or resource with its internal functionality, it may export the data content to an alternate media player application, so that the data content may be processed and displayed by the alternate media player.

An example of a browser is Microsoft Internet Explorer™ (IE). IE typically may be used as a standalone application, but it also may be used by other applications, for example, as an ActiveX™ component to allow those applications to call upon IE's functionality and have IE's functionality blend in with and appear as a component and integral part of those applications. Some applications can embed IE functionality using the ActiveX component to provide a web-browsing and information display capability, but without the outward appearance that IE presents to a user as a standalone application. For example, a software application provided by an Internet Service Provider (ISP) to enable its subscribers access to the ISP's servers may use IE functionality as an ActiveX component, but may display a non-IE graphical user interface (GUI) to the subscriber, so that subscribers identify the application with the ISP, rather than with IE. Such an embedded instance of IE may be referred to as an "internal browser," as contrasted with using IE as a standalone application, in which case, IE as a standalone application may be referred to as an "external browser."

Whether IE is used as an internal browser or an external browser to locate and access data from either a local or remote location, it may be used to retrieve a stream of data. Examples of data stream types include text, hypertext, graphics, soundfiles, and multimedia. For IE to properly handle a stream of data, IE generally receives information indicating the type of data included in the stream, or otherwise gleans the type of data from the stream. For this purpose, IE uses a content-type encoding standard known as the MIME (Multipurpose Internet Mail Extensions) standard to specify the type of data included in the media stream. A MIME type includes a <type>/<subtype> specifier. Some protocols, such as HTTP, provide a mechanism for specifying the MIME type of a stream. Examples include "text/ html" for an HTML type text stream, "text/plain" for a plain text type stream, and "image/jpeg" for a jpeg image stream. For other protocols that do not explicitly identify the MIME type of a stream, the MIME type of the stream may be identified using one or more diagnostic tests or filters.

As a browser, IE can include and access built-in functionality to reproduce or display some types of media, such as HTML, plain text, and JPEG images, while including functionality to export those and other media types, such as sound files and video files, for reproduction by one or more alternate media players, such as RealNetworks RealPlayer® or Microsoft Windows Media Players®.

The MIME type associated with a data stream may be used to determine whether the media stream should be reproduced and displayed by the browser or whether the media stream should instead be exported by the browser for reproduction and display by an alternate player. IE allows for the registration of media players that are capable of, and ultimately responsible for, reproducing or displaying the media types handled by IE internally, as well as those handled by IE externally, so as to enable desired media players to be specified for particular media types.

Specifically, a mapping from MIME type to media player may be maintained within the operating system (OS). For example, in the Windows® operating system, a registry of mappings (Windows® registry) is maintained that associates data stream types with media players. Under normal circumstances, this mapping is used to resolve the appropriate media player for an incoming data stream, whether IE is running as an internal or external browser. Because the alternate media player for reproducing or playing a type of data stream is determined by the OS mapping, however, an application using IE as an ActiveX component may modify the mapping if media players other than those specified in the Windows® registry are desired. This modification may be performed by changing the Windows® registry itself, or by overriding or supplementing the Windows® registry with other or additional registrations. In this way, it is possible to control the choice of media player, without modifying the Windows® registry by modifying the choice of the alternate media player to which a data stream is directed when IE operates as an external browser.

Figure 4:
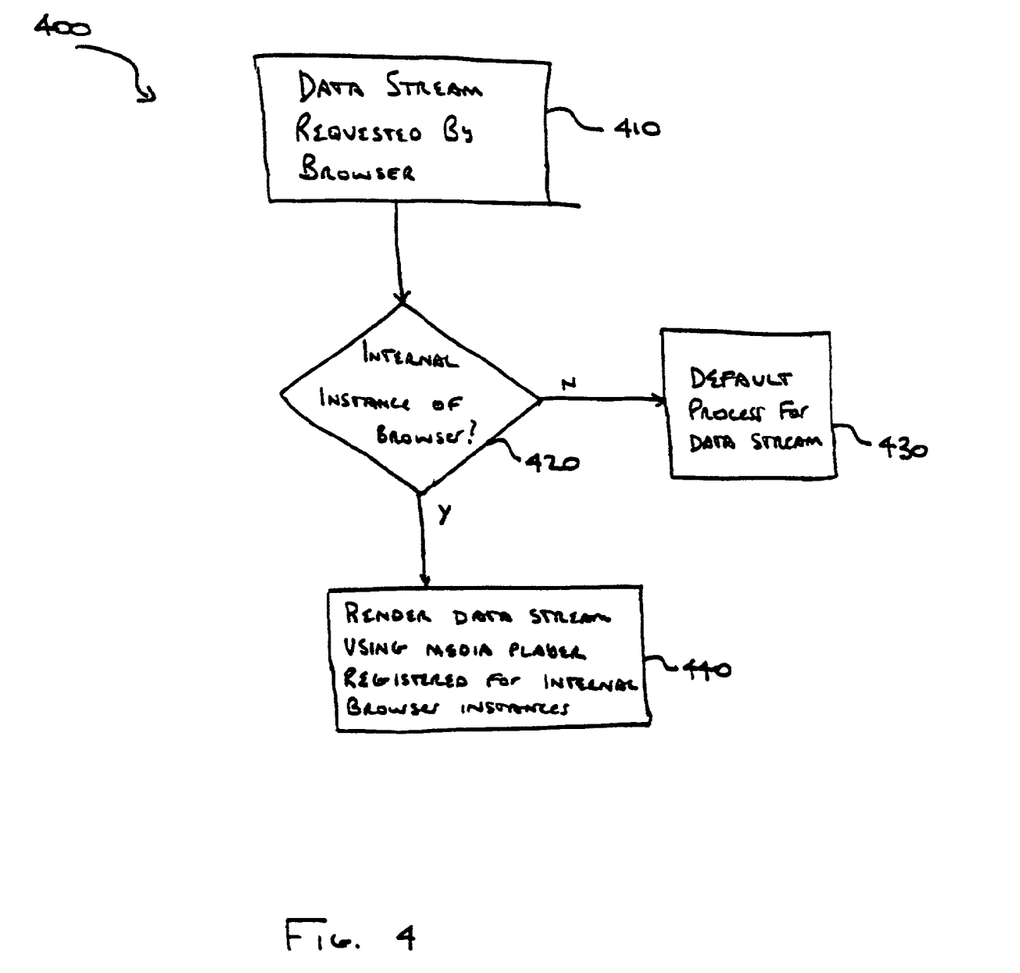
FIG. 4 is a flow chart of a process for determining if a data stream should be rendered with a desired alternate media player.

Referring to FIG. 4, analysis 400 of a data stream is performed to determine whether an alternate media player should be called to play the data stream. After a data stream is requested by or directed to a browser (step 410), analysis is performed to determine whether the browser instance is internal or external (step 420).

In one implementation, after the browser receives a data stream (step 410), a MIME filter is applied to the data stream. A MIME filter is an asynchronous pluggable protocol (APP) that is implemented as a Component Object Model (COM) used to implement a set of COM interfaces. The MIME filter typically is invoked for a specified MIME type and is used to perform some operation relative to that MIME type. In this instance, it is used to discriminate between internal instances and external instances of the browser, and to load temporary Windows® registrations for MIME types or to perform specified functions for the MIME types upon the occurrence of an internal browser instance (described later with respect to step 440).

IProtocolSink is an interface for pluggable MIME filters that is used to receive notifications if/when data is available for filtering. IProtocolSink allows the APP to obtain a window handle for the client performing the bind operation. Although this window handle typically is used for other purposes, it can be used to determine whether an instance of a MIME filter originated from an internal browser.

If the browser is not an internal browser, the data stream may be handled using the default process (step 430). However, if the browser instance is internal, then action may be taken to render the data stream using a media player according to mappings other than those maintained for external instances of the browser (step 440), which media player may or may not differ from the media player identified by the mappings maintained for external instances (hereinafter "an alternative media player") as described, for example, with respect to FIGS. 5-7.

Figure 5:
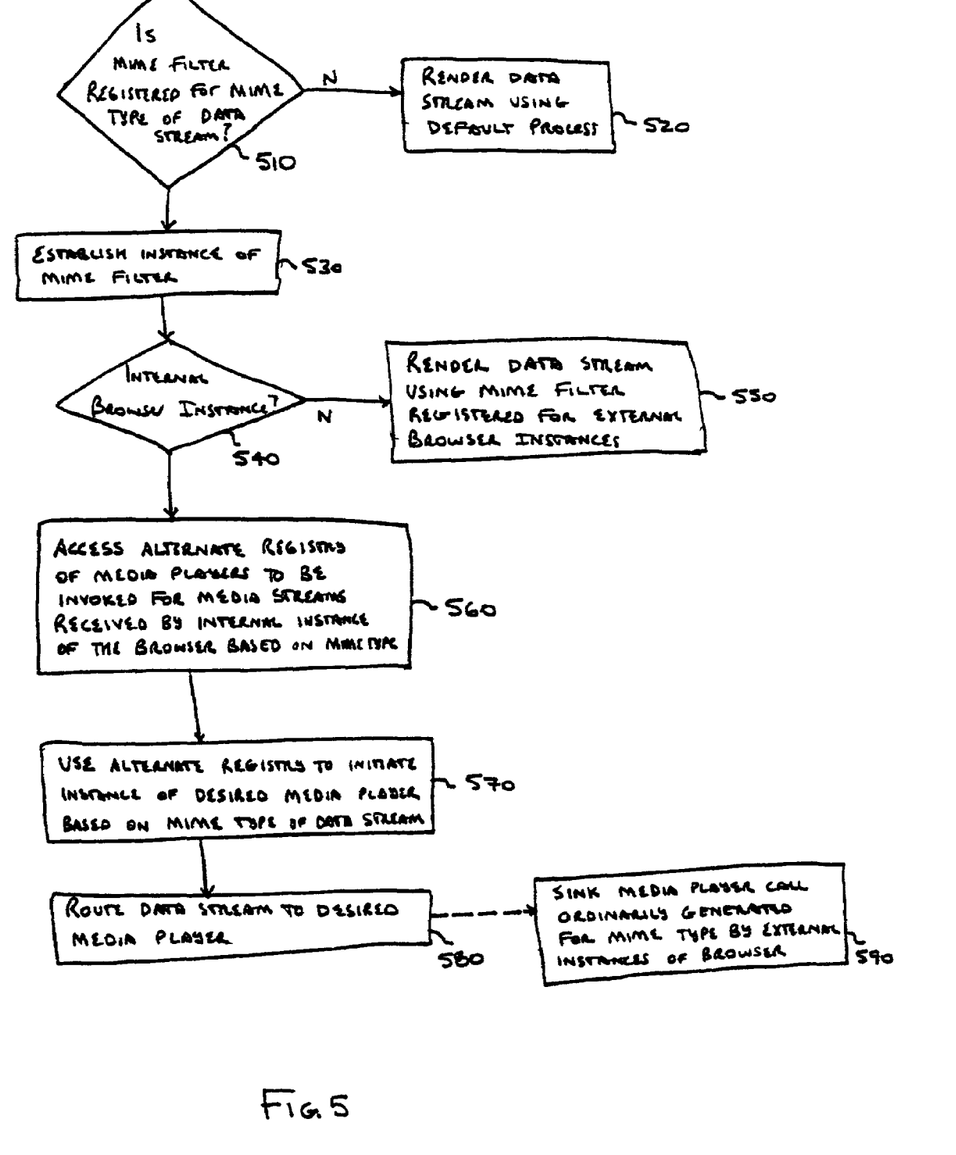
FIG. 5 is a flow chart of a process for routing electronic media content to a desired software application.

Referring to FIG. 5, a MIME filter may be used to identify a media player to be used in rendering a data stream retrieved or directed to an internal instance of the browser.

Specifically, the MIME type for a data stream is checked against registrations or mappings that are maintained for internal instances of the browser (step 510). For example, MIME filters can be registered either permanently or temporarily. Permanent MIME filters are registered within the Windows® registry and tend to affect all instances of IE, unless preempted by temporary MIME filters. Temporary MIME filters are associated with a specific instance of IE and tend to be given priority over permanent MIME filters when handling a data stream. When multiple temporary MIME filters are registered for a particular MIME type, the order of selection among the multiple temporary MIME filters may be inverted relative to the order used for their registration (e.g., the most recently registered MIME filter is selected first), or otherwise. In this instance, temporary MIME filters may be loaded when an internal instance of the browser is detected/invoked and removed when that internal instance of the browser is shut down.

If a MIME filter is not registered for the MIME type of the data stream, the data stream may be handled using some other default process (step 520). If there is a temporary or permanent MIME filter that is registered for the data stream's MIME type, an instance of that MIME filter is established (step 530).

Next, analysis is performed to determine whether the data stream was requested by an internal instance of a browser (step 540). This analysis may be performed as described above in FIG. 4. If the data stream was not requested by an instance of an internal browser, additional action may not be required and the default media player may be called to render the data (step 550).

If the data stream was requested by an instance of an internal browser, the registry structure is modified to include registrations of media players appropriate for internal instances of the browser or some other list of alternate media player registrations is accessed, and that modified or alternate registry is analyzed to determine which media player is registered for the MIME type (step 560). Then, an instance of an appropriate alternate media player is established (step 570) and the data stream is effectively routed for rendering to the alternate media player (step 580). Absent further processing, after the media stream is rendered, the MIME filter returns the data stream to URLMON. Therefore, to prevent invocation of a second media player according to the modified Windows® registry, it may be desirable or necessary to sink the data stream (step 590).

Figure 6:
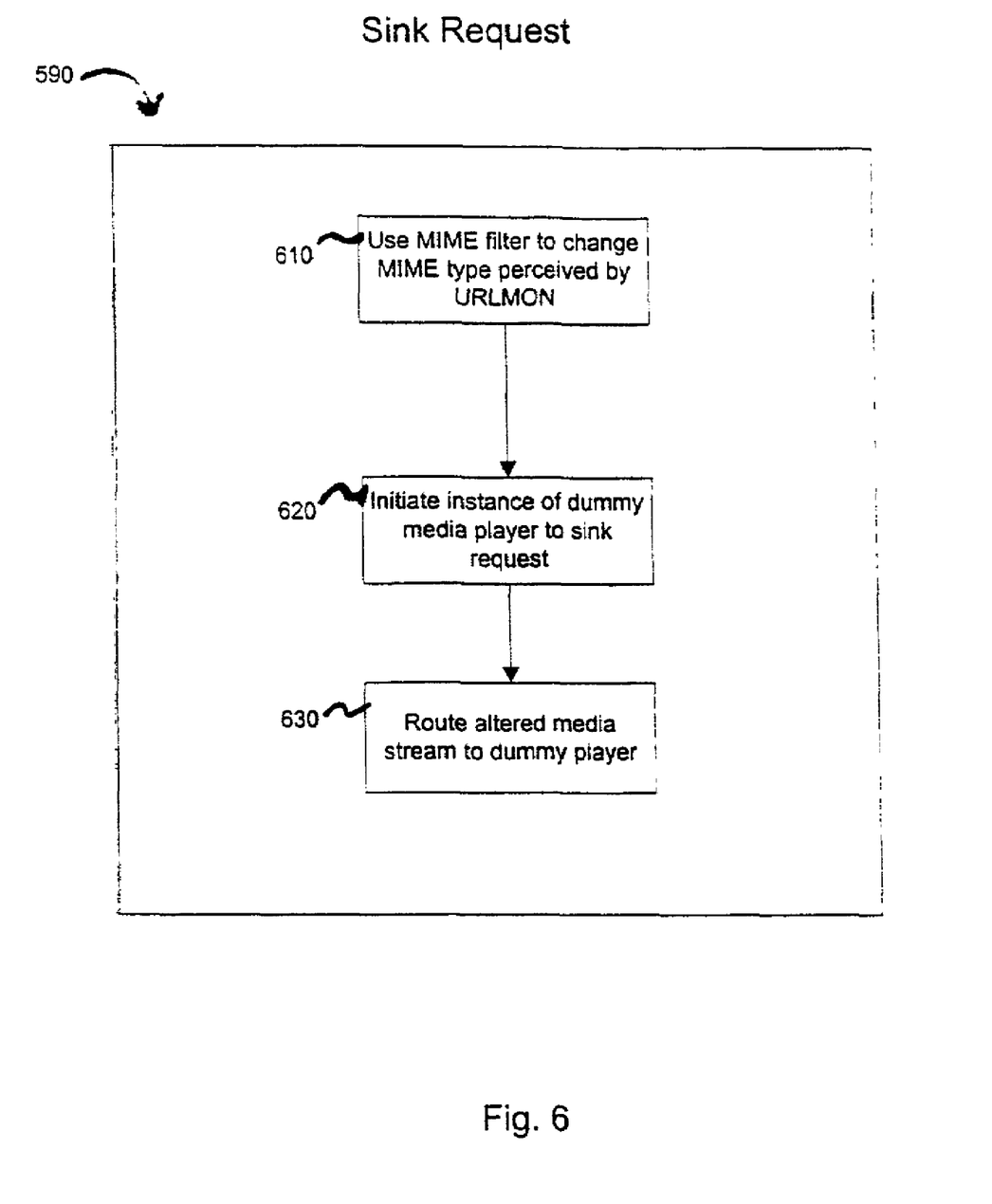
FIG. 6 is a flow chart of a process for sinking a data stream.

FIG. 6 illustrates one implementation for sinking a call for a default media player ordinarily generated for data streams of similar MIME type by external instances of a browser (step 590). In this implementation, the MIME filter changes the MIME type of the data stream returned to URLMON to a predetermined MIME type (step 610) for which no media player or a dummy media player has been registered. As a result, when the browser detects the altered MIME type in the data stream, the browser will initiate either no media player or an instance of this dummy media player, as appropriate (step 620). Then, to complete the data sink, the modified data stream is effectively routed to this dummy media player, which accesses the data stream and either discards the data stream or performs some trivial or background function on the data stream.

Figure 7:
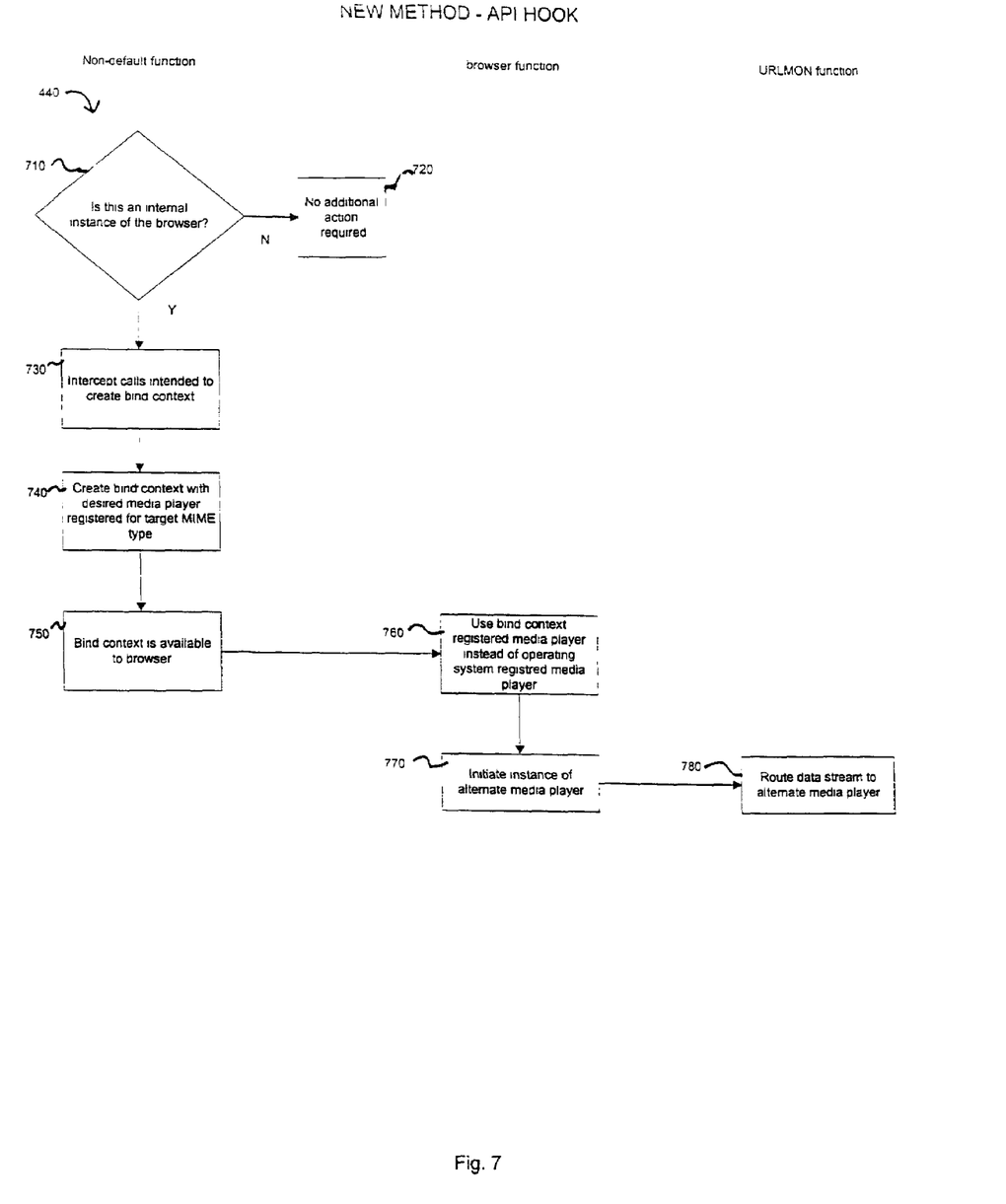
FIG. 7 is a flow chart of a process for routing electronic media content to a desired software application.

Referring to FIG. 7, a data stream also can be directed to an alternate media player using an API hooking approach. This alternate approach provides a similar result to the procedure described above in FIGS. 5 and 6. However, using this approach, it may be possible to eliminate the step of sinking the data stream returned to an internal browser.

Similar to steps 420 and 540 described above, the instance of the browser is analyzed to determine whether it is an internal browser or an external browser (step 710). If the browser is not an internal browser, no additional action is required and the browser will function according to default settings (step 720).

If the browser is an internal browser, then calls used to initiate the creation of a default bind context that is ordinarily created for each invocation of a browser are intercepted (step 730), preferably before the browser can create the bind context necessary to invoke the browser. More specifically, the bind context is an object typically used to hold information useful in overriding default information registered with the operating system. Since a bind context ordinary is created for each invocation of a browser, any override of default information is used only for the current transaction.

Specific calls typically are used for bind context creation. For example, calls to CreateBindCtx or CreateAsyncBindCtx may be intercepted because they are used to create a bind context via OLE32 or URLMON, respectfully. This typically is referred to as Import Address Table (IAT) hooking. The IAT is a special section within the Portable Executable (PE) file format that is used to dispatch calls to imported functions located within other modules. Functions that are imported for use from other Dynamic Link Library (DLL) modules are not called directly by the importing DLL or module, but rather are called indirectly through a dispatch table of function pointers. Thus, using this method, calls to imported functions may be intercepted by manipulating the function pointers within a dispatch table rather than calling the function directly. In this implementation, the intercepted call may be used to provide a pointer, IBindCtx, to the bind context that can be used later.

After the bind context is created, the alternate media player is registered in the bind context (step 740). A pointer to the bind context may be required for this registration. The IBindCtx pointer (e.g., acquired during step 730) can be used for this purpose. Additionally, the IBindCtx pointer can be passed as a parameter to the function call RegisterMediaTypeClass to register the alternate media player.

The bind context is now available to the browser (step 750). The browser uses settings from the bind context to override the default media player registration with the alternate media player. As a result, the browser calls the alternate media player to render the data stream instead of the default media player (step 760).

The browser then initiates an instance of the alternate media player (step 770) and the data stream is effectively routed to it for rendering (step 780).

A number of implementations have been described. Nevertheless, it will be understood that various modifications may be made which are within the scope of the following claims. For instance, in the process shown by FIG. 5, it is possible to rearrange the order of processing such that a pre-screening is performed to identify internal instances of browser at the outset (step 540), rather than after a comparison of the MIME type to stored MIME filters.

What is claimed is:

1. A method of processing a data stream with a computer system, the method comprising:
   receiving a data stream using a browser application;
   detecting a content type of data in the data stream;
   determining whether the browser application is invoked within an application environment of an internet service provider to enable a subscriber of the internet service provider to access an online resource;
   temporarily overriding a default rendering process otherwise associated with the content type detected for the data in the data stream by associating a particular rendering process with the data stream based on the content type of data in the data stream and based on results of the determination of whether the browser application is invoked within the application environment of the internet service provider, wherein:
     the default rendering process is identified in a registry of a computer, and
     temporarily overriding the default rendering process identified in the registry of the computer includes changing the registry of the computer such that the default rendering process identified in the registry of the computer and associated with the content type of data in the data stream is replaced with the particular rendering process if the browser application is determined to have been invoked within the application environment of the internet service provider; and
   routing the data stream to the particular rendering process.

2. The method of claim 1 wherein the data steam is received in response to a request from the browser application.

3. The method of claim 1 further comprising routing the data stream to the default rendering process if the browser application is determined to have been invoked outside the application environment of the internet service provider.

4. The method of claim 1 further comprising:
   processing the data stream with the particular rendering process; and
   upon completing of the processing, disassociating the particular rendering process with the content type of data in the data stream.

5. The method of claim 1 wherein invoking the browser comprises enabling access to browser functionality as an ActiveX component in an application provided by the internet service provider.

6. The method of claim 1 wherein temporarily overriding the default rendering process includes supplementing the registry of the computer such that the default rendering process identified in the registry of the computer and associated with the content type of data in the data stream is replaced with the particular rendering process if the browser application is determined to have been invoked within the application environment of the internet service provider.

7. The method of claim 1 wherein temporarily overriding the default rendering process includes changing the registry of the computer in response to the data stream received by the browser application that is running on the computer.

8. The method of claim 1 wherein the particular rendering process includes a content rendering process for processing the content of the data stream.

9. A computer program for processing a data stream with a computer system, stored on a computer readable medium, comprising instructions for:
receiving a data stream using a browser application;
detecting a content type of data in the data stream;
determining whether the browser application is invoked within an application environment of an internet service provider to enable a subscriber of the internet service provider to access an online resource;
temporarily overriding a default rendering process otherwise associated with the content type detected for the data in the data stream by associating a particular rendering process with the data stream based on the content type of data in the data stream and based on results of the determination of whether the browser application has been invoked within the application environment of the internet service provider, wherein:
the default rendering process is identified in a registry of a computer system, and
temporarily overriding the default rendering process identified in the registry of the computer system includes changing the registry of the computer system such that the default rendering process identified in the registry of the computer system and associated with the content type of the data in the data stream is replaced with the particular rendering process if the browser application is determined to have been invoked within the application environment of the internet service provider; and
routing the data stream to the particular rendering process.

10. The computer program of claim 9 wherein the data steam is received in response to a request from the browser application.

11. The computer program of claim 9 further comprising routing the data stream to the default rendering process if the browser application is determined to have been invoked outside the application environment of the internet service provider.

12. The computer program of claim 9 further comprising:
processing the data stream with the particular rendering process; and
upon completing of the processing, disassociating the particular rendering process from the content type of data in the data stream.

13. The computer program of claim 9 wherein invoking the browser comprises enabling access to browser functionality as an ActiveX component in an application provided by the internet service provider.

14. The computer program of claim 9 wherein temporarily overriding the default rendering process includes supplementing the registry of the computer system such that the default rendering process identified in the registry of the computer system and associated with the content type of data in the data stream is replaced with the particular rendering process if the browser application is determined to have been invoked within the application environment of the internet service provider.

15. The computer program of claim 9 wherein temporarily overriding the default rendering process includes changing the registry of the computer system in response to the data stream received by the browser application that is running on the computer system.

16. The computer program of claim 9 wherein the particular rendering process includes a content rendering process for processing the content of the data stream.

17. The computer program of claim 9 further comprising instructions for:
processing the data stream with the particular rendering process; and
upon completing of the processing, disassociating the particular rendering process with the content type of data in the data stream.

* * * * *